(12) United States Patent
Sievers et al.

(10) Patent No.: US 9,550,325 B2
(45) Date of Patent: Jan. 24, 2017

(54) METHOD AND APPARATUS FOR THE PRODUCTION OF A WORKPIECE OF EXACT GEOMETRY

(75) Inventors: Tim Sievers, Munich (DE); Andreas Lohner, Putzbrunn (DE)

(73) Assignee: BU:ST GmbH (DE)

( * ) Notice: Subject to any disclaimer, the term of this patent is extended or adjusted under 35 U.S.C. 154(b) by 1268 days.

(21) Appl. No.: 12/245,140

(22) Filed: Oct. 3, 2008

(65) Prior Publication Data

US 2009/0033003 A1 Feb. 5, 2009

Related U.S. Application Data

(63) Continuation of application No. 10/719,585, filed on Nov. 21, 2003, now abandoned, which is a
(Continued)

(30) Foreign Application Priority Data

May 21, 2001 (DE) .................. 101 24 795

(51) Int. Cl.
| | |
|---|---|
| *B29C 35/08* | (2006.01) |
| *B29C 41/02* | (2006.01) |
| *B29C 67/00* | (2006.01) |
| *B22F 3/105* | (2006.01) |
| *B22F 3/24* | (2006.01) |

(52) U.S. Cl.
CPC ......... *B29C 67/0077* (2013.01); *B22F 3/1055* (2013.01); *B22F 3/24* (2013.01); *B22F 2003/1056* (2013.01); *B22F 2003/247* (2013.01); *B29K 2995/0073* (2013.01); *Y02P 10/295* (2015.11)

(58) Field of Classification Search
USPC ........................ 264/308, 497, 162
See application file for complete search history.

(56) References Cited

U.S. PATENT DOCUMENTS

| | | |
|---|---|---|
| 2,736,148 A | 2/1956 | Thatcher |
| 2,804,724 A | 9/1957 | Thatcher |
| | (Continued) | |

FOREIGN PATENT DOCUMENTS

| | | |
|---|---|---|
| DE | 19533960 A1 | 3/1997 |
| DE | 19841892 C1 | 9/1999 |
| | (Continued) | |

OTHER PUBLICATIONS

International Search Report, PCT/EP02/05574, Sep. 5, 2002, 2 pages.
(Continued)

*Primary Examiner* — Leo B Tentoni
(74) *Attorney, Agent, or Firm* — Whitmyer IP Group LLC

(57) ABSTRACT

This invention relates to a device and procedure for the production of a work piece with exact geometry and high surface quality, a form tool in particular. Preferably, the work piece is constructed using a process wherein powder coatings are applied one on top of each other, by means of compaction, said process being computer-controlled. After the powder has been compacted, the surfaces thereof are finely machined in a mechanical manner. During the entire machining process, the work piece to be produced is surrounded with powdery source material.

6 Claims, 3 Drawing Sheets

Related U.S. Application Data continuation of application No. PCT/EP02/05574, filed on May 21, 2002.

(56) References Cited

U.S. PATENT DOCUMENTS

| | | |
|---|---|---|
| 3,091,060 A | 5/1963 | Giegerich et al. |
| 3,471,724 A | 10/1969 | Balamuth |
| 3,753,322 A | 8/1973 | Bordes |
| 4,680,897 A | 7/1987 | Daniels et al. |
| 4,934,103 A | 6/1990 | Campergue et al. |
| 5,136,815 A | 8/1992 | Kramarenko et al. |
| 5,207,371 A | 5/1993 | Prinz et al. |
| 5,230,182 A | 7/1993 | Daniell et al. |
| 5,303,510 A | 4/1994 | Calkins |
| 5,427,733 A | 6/1995 | Benda et al. |
| 2003/0185697 A1* | 10/2003 | Abe et al. ............ 419/6 |

FOREIGN PATENT DOCUMENTS

| | | |
|---|---|---|
| DE | 10065960 A1 | 12/2001 |
| JP | 2000073108 A | 3/2000 |

OTHER PUBLICATIONS

Translation of Japanese Office Action, Jul. 4, 2006, 2 Pages.
Translation of Offenlegungsschrift DE 19533960A1, Mar. 20, 1997.

* cited by examiner

METHOD AND APPARATUS FOR THE PRODUCTION OF A WORKPIECE OF EXACT GEOMETRY

CROSS-REFERENCE TO RELATED APPLICATIONS

This application is a continuation of U.S. patent application Ser. No. 10/719,585 filed Nov. 21, 2003 now abandoned, which in turn is a continuation of International patent application PCT/EP2002/005574 filed on May 21, 2002 which designates the United States and claims priority from German patent application 101 24 795.8 filed on May 21, 2001, the content of which is incorporated herein by reference.

FIELD OF THE INVENTION

The invention relates to a method for the production of a work piece by the successive compacting, by means of electromagnetic radiation or particle radiation, of powdered starting material that has been applied horizontally in layers, so that each layer consisting of at least one trace comprises two substantially vertical lateral faces and one substantially horizontal upper face which, in turn, forms the basis for a possible following layer, wherein at least one of the two vertical side walls is subject to mechanical finishing subsequent to the compacting of the powdered starting material that has been applied horizontally in layers, and wherein the work piece to be formed is surrounded by powdered starting material during its production. Furthermore, the invention is directed to a device for performing the above-described method.

BACKGROUND OF THE INVENTION

DE 195 33 960 C2 discloses a method wherein one material layer each is applied on a base in the form of a trace and is subsequently fused or compacted, respectively, by means of a laser beam. Subsequently, a second layer is applied and compacted, and so on, with the number of the layers applied and compacted by means of a laser beam depending on the desired height of the work piece. On applying a new layer, this new layer always combines with the surface of the layer applied before. The powder-metallurgical production of the work piece is followed by a finishing of both the lateral faces and the surface by means of a cutting process. In the case of the known method it is taken care that non-melted powder is always removed from the working area by blowing or sucking it off.

With the method known, comparatively short production times can be achieved for exactly dimensioned work pieces when the radiation device and the mechanical processing device are computer-controlled. A problem of the production method known, however, consists in that in the edge area of the work pieces produced, i.e. in the area of the lateral faces, a non-uniform material consistency is generated and that especially porosities may occur.

For solution of this problem, DE 195 33 960 C2 suggests to fuse material beyond the desired contour dimension and to remove the distinctly projecting edges of the work piece by means of subsequent mechanical processing. By means of this procedure, it is indeed possible to remove so much material in the area of the lateral faces that a homogeneous material consistency can be achieved; this, however, renders the expenses, i.e. the working time and the tool costs, to become undesirably high.

It is therefore an object of the present invention to provide a method which substantially reduces the materials expenses with a mechanical finishing of the surface of the outer contour of the work piece and simultaneously ensures a high surface quality of the outer contour.

SUMMARY OF THE INVENTION

In accordance with the invention, this object is solved by a method for the production of a work piece by the successive compacting, by means of electromagnetic radiation or particle radiation, of powdered starting material that has been applied horizontally in layers, so that each layer consisting of at least one trace comprises two substantially vertical lateral faces and one substantially horizontal upper face which, in turn, forms the basis for a possible following layer, wherein at least one of the two vertical side walls is subject to mechanical finishing subsequent to the compacting of the powdered starting material that has been applied horizontally in layers, and wherein the work piece to be formed is surrounded by powdered starting material during its entire production, wherein the mechanical finishing of a vertical side wall of an $n^{th}$ layer is only performed after the generation of an $n+x^{th}$ layer.

In the following, the respectively current layer, i.e. the layer that forms the upper final layer at a particular point in time, is referred to as $n^{th}$ layer. All the layers positioned below this $n^{th}$ layer are referred to as $n-x^{th}$ layers, and all the layers that will, viewed from this point in time, still have to be produced in the future, are referred to as $n+x^{th}$ layers.

In a preferred method of the present invention, the finishing of the $n^{th}$ layer is started only when the geometric distance from the $n^{th}$ layer to an $n+x^{th}$ layer positioned thereabove is so large that no thermal impact having the effect of a distortion affects the $n^{th}$ layer.

When producing a work piece in accordance with the method according to the invention, the powdered starting material is applied in layer-thickness on a base over an area which exceeds the contour of the work piece. In a next step, compacting of this powdered starting material is effected in traces, with the trace width corresponding to the sphere of action of the radiation. For the construction of a layer, which regularly consists of a plurality of traces, at least, however, of merely one trace, these traces are compacted such that the edge area of each individual trace overlaps the edge area of an adjacent trace such that a homogeneous trace is produced during the compacting of the adjacent traces. When producing a layer formed by traces, various strategies of tracing can be chosen.

For instance, the outermost contour trace is formed by a first trace, and subsequently the inner space formed within this closed contour trace is filled by a meander-shaped pattern, so that a homogeneous layer is finally produced. It is, however, also possible to fill the inner space that has been formed such by, for instance, a quasi-spiral pattern.

By the exact controlling of the compacting beam (electromagnetic beam or particle beam) it is further possible to adjust the material characteristics in the area of the edge contour, i.e. the outermost contour trace of the work piece.

With increasing beam power or energy supplied per area unit, the proportion of molten phase of the material increases, which results in a high compacting of the material and thus in good mechanical properties. In the direct edge area of the work piece, i.e. in the area of the lateral surface, such compacting of the powdered material will, however, also lead to an inexactness of the structure. A disadvantage of a high beam intensity is the thermal effect which may lead to a subsequent powder adherence in the n−1$^{st}$ or in further layers. By the respectively repeated thermal impact of the n−x$^{th}$ layers already formed, a so-called distortion of the contour of the work piece may occur.

The method according to the invention takes this thermal influence of the work piece contour into account by performing the mechanical finishing after the completion of a certain number of layers only. In accordance with the invention, the finishing is only performed with layers which are, by their distance to the currently produced layer, not subject to a thermal impact effecting a distortion of the work piece.

In accordance with the invention, several layers can be finished simultaneously. If only individual layers are referred to in the following description, these shall comprise also layer packages that may consist of a plurality of individual layers.

A decision on the number of the layers to be finished may, for instance, depend on the contour shape. In the case of contours with frequent changes of gradient, the finishing of few layers may be more advantageous than the finishing of several layers.

BRIEF DESCRIPTION OF THE DRAWINGS

The method and the apparatus according to the invention will be explained by way of example in the enclosed drawing. There shows:

FIG. 2 a schematic sectional representation of a work piece after the production of a first layer package;

FIG. 3 a schematic sectional representation of the work piece according to FIG. 2 with a second layer package;

FIG. 4 a schematic sectional representation of the work piece according to FIG. 3, with the first layer package being finished;

FIG. 5 a schematic sectional representation of the work piece according to FIG. 4, after the generation of a further layer package;

FIG. 6 a schematic sectional representation of the work piece according to FIG. 5, after completion of the finishing of a further layer package;

FIG. 7 a schematic sectional representation of the work piece according to FIG. 6, after the generation of a last layer package;

FIG. 8 a schematic sectional representation of the work piece according to FIG. 7, after completion of the finishing of the penultimate layer package;

FIG. 9 a schematic sectional representation of the work piece according to FIG. 8, after completion of the finishing of the last layer package.

DETAILED DESCRIPTION OF THE INVENTION

Figure 1:
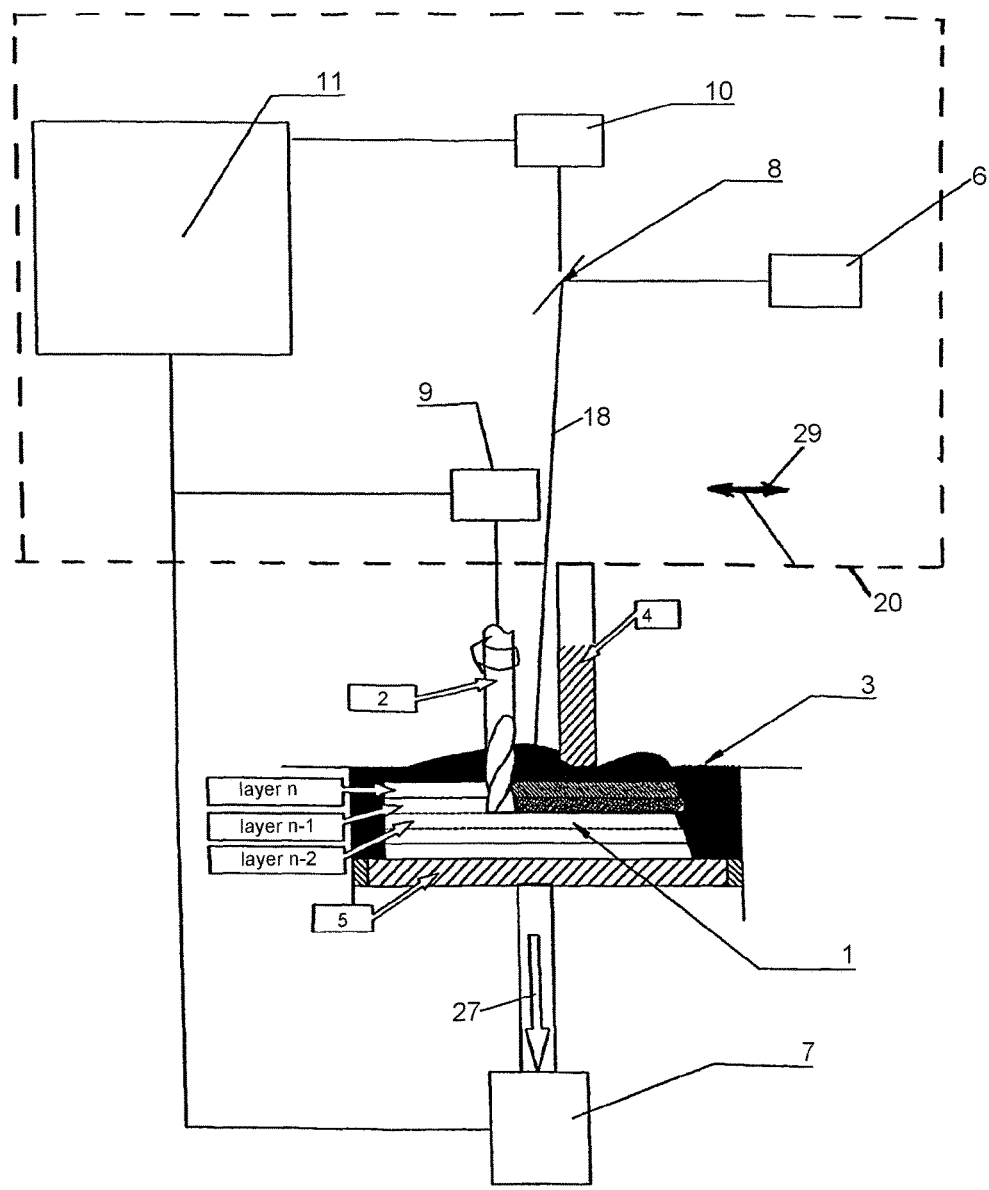
FIG. 1 a schematic representation of an arrangement for performing the method according to the invention.

In the arrangement according to FIG. 1, the work piece to be produced is denoted with 1. The production is effected such that powdered starting material 3 at an exactly predetermined layer thickness s is applied on a working table 5 that may be moved up and down vertically by means of a lifting device 7 in arrow direction 27. The starting layer thickness equals to the layer thickness of layer n, layer n−1 or layer n−2 illustrated in the drawing. The area of the powdered starting material applied has to exceed the desired final contour of the work piece.

Above the working table 5, a processing unit 20 is arranged which can be moved in its entirety in arrow direction 29 as well as preferably perpendicularly to the drawing plane. The movement of the processing unit 20 is computer-controlled by a control device 11 which also simultaneously controls the lifting movement of the working table 5. The processing unit 20 substantially comprises a radiation source 6, one or several mirrors actuated by an actuating unit 10, or a comparable guiding device for the beam 18 emanating from the radiation source 6 so as to guide it by means of two-coordinate control on the working table 5 in correspondence with the desired component contour. In addition to the radiation device 6, 8, 10 the processing unit 20 also comprises a processing device for mechanical finishing. The processing device illustrated in FIG. 1 is a milling tool 2 with an appropriate drive unit 9 which is also controlled by the control unit 11. As is illustrated in FIG. 1, the milling tool 2 immerses into the powdered starting material 3 for mechanical finishing, so that the work piece 1 is surrounded by powdered finishing material 3 during its entire production and thus also during the entire mechanical finishing. Furthermore, a dressing bar 4 is provided at the processing unit 20, by means of which powdered starting material 3 that was applied on the working table 5 can be distributed at constant layer-thickness by transverse movement of the processing unit 20 relative to the working table 5. The dressing bar 4 may simultaneously be designed as a feeding device for the powdered starting material 3.

After applying the first layer of the powdered starting material 3 on the working table 5, the starting material is compacted in a desired trace by a corresponding control of the beam 18 and, as required, additionally by the relative movement of the processing unit 20 to the working table 5. Each time after one layer has been applied and compacted, the working table 5 is lowered by one layer-thickness by means of the lifting device 7. Following the radiation and compacting of the powdered starting material to form a first (n$^{th}$ layer), further (n+1$^{st}$; n+2$^{nd}$; n+3$^{rd}$; . . . ; n+x$^{th}$) layers are applied and compacted by this method corresponding to a desired contour which is preferably stored on a record. Only after the generation of a current layer which is spaced apart from a non-finished layer to such an extent that the thermal effect emanating from this current layer does not or is not able to effect any distortion with this non-finished layer is the mechanical finishing of this non-finished layer started.

Figure 2:
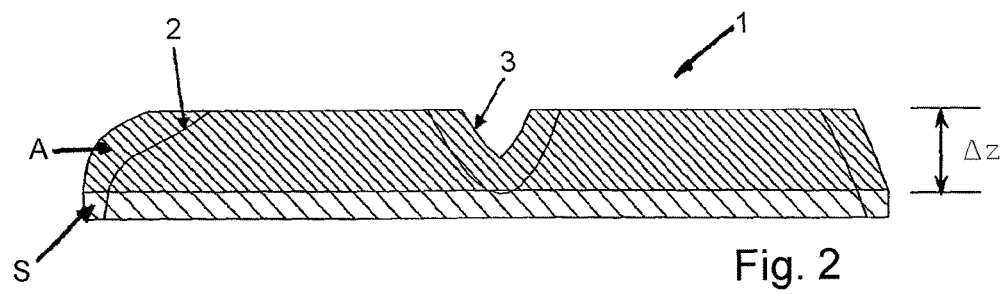
In FIGS. 2 to 9, individual steps of the method according to the invention are illustrated, wherein layer packages are shown for better illustration of the method according to the invention. There shows.

The arrangement according to FIG. 2 illustrates a work piece 1 after the production of a first layer package A having the height Δz, illustrated in double hatching density. The work piece 1 is mounted on a base S, with the height of the base S advantageously corresponding to the milling offset Δh. The work piece 1 is to obtain a final contour that corresponds to the contour 2 and lies within a contour body 3. This contour body 3 is produced from a particular number of layer packages of the height Δz, which in turn consist of a plurality of layers. The dimensional difference between the contour body 3 and the work piece 1 is removed by the mechanical finishing, so that the completed work piece 1 is available after the mechanical finishing of the last layer package.

Figure 3:
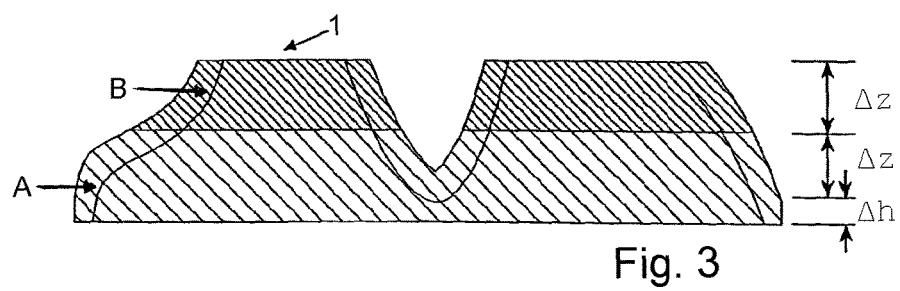

FIG. 3 illustrates the condition of the work piece 1 after the generation of the second layer package B above the first layer package A, with the second layer package B also having a height of Δz. It is, however, also possible to vary the height of each layer package, for instance as a function of the contour shape of the final contour. In the case of contours with substantial change of gradient of the surface, a lower layer package height might also be of advantage. Likewise, the layer package height may depend on the type of miller. Basically, the layer package height will have to he chosen such that any desired contour may be achieved with the selected miller by keeping to the desired surface quality. A substantial technical dimension may, for instance, be the radius of a ball nose end mill.

Figure 4:
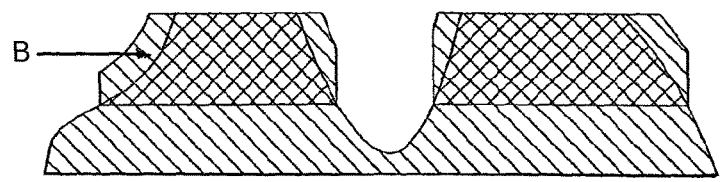

FIG. 4 illustrates the condition after the completion of the first mechanical finishing of layer package A. The mechanical finishing is preferably performed by means of an end mill or a ball nose end mill which removes the dimensional difference between the contour body 3 and the final contour 2 of the work piece 1. After completion of the finishing, a new layer package is produced, wherein the finishing is also postponed until at least the next layer package has been produced.

Figure 5:
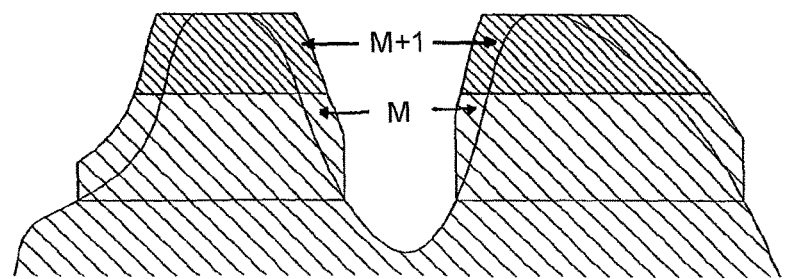
Figure 6:
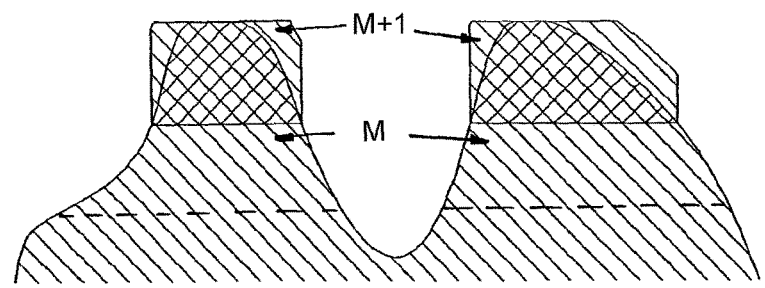
Figure 7:
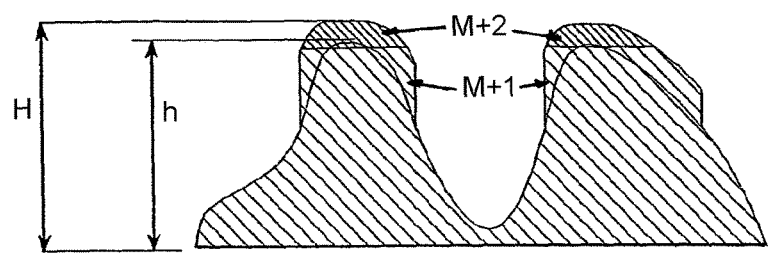

FIG. 5 schematically illustrates the condition of the two layer packages M and M+1. FIG. 6 illustrates the finished layer package M. As is illustrated in FIG. 7, the last layer package M+2 which is positioned above the layer package M+1 is advantageously dimensioned such that it projects by a certain amount H-h over the actual final contour height h. With the completion of the last layer of the layer package M+2, the layer construction of the work piece 1 has been completed.

Figure 8:
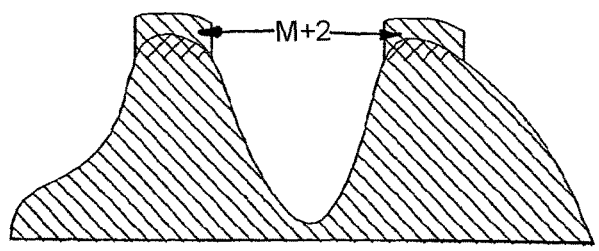
Figure 9:
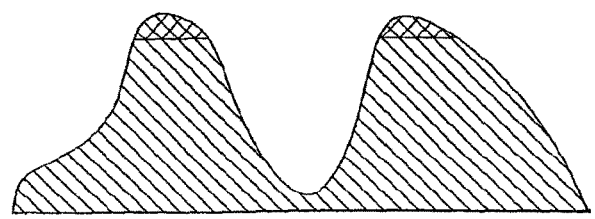

In the following working step, illustrated in FIG. 8, the mechanical finishing of the layer package M+1 is performed, wherein, caused by the contour shape, portions of the projecting layer package M+2 can also be removed already. The projecting remainder of the layer package M+2 that has now been left is, as illustrated in FIG. 9, removed by means of the last mechanical finishing. With this last working step, the production of the work piece 1 is totally completed.

What is claimed is:

1. A method for the production of a work piece by the successive compacting, by means of electromagnetic radiation or particle radiation, of powdered starting material that has been applied horizontally in layers, so that each layer consisting of at least one trace comprises two substantially vertical lateral faces and one substantially horizontal upper face which, in turn, forms the basis for a possible subsequent layer, wherein at least one of the two vertical side walls is subject to mechanical finishing subsequent to the compacting of said powdered starting material that has been applied horizontally in layers, and wherein the work piece to be formed is surrounded by said powdered starting material during its production and during the mechanical finishing, wherein the mechanical finishing of a vertical side wall of a subject ($n^{th}$) layer is performed after the generation of at least one subsequent ($n+x^{th}$) layer only and wherein mechanical finishing of the at least one subsequent ($n+x^{th}$) layer is not performed at the same time as mechanical finishing of the subject ($n^{th}$) layer, and wherein mechanical finishing of the subject ($n^{th}$) layer is started only after a sufficient enough number of subsequent ($n+x^{th}$) layers are created such that a distance between the subject ($n^{th}$) layer and a most recently formed one of the at least one subsequent ($n+x^{th}$) layer is sufficiently great that there exists substantially no thermal impact having a distorting effect on the subject ($n^{th}$) layer.

2. The method according to claim 1, wherein at least one subsequent ($n+x^{th}$) layer has been produced between the production of the subject ($n^{th}$) layer and the beginning of the mechanical finishing of the subject ($n^{th}$) layer.

3. The method according to claim 1, wherein several layers are finished simultaneously.

4. The method according to claim 1, wherein several layers are comprised to form layer packages.

5. The method according to claim 4, wherein the mechanical finishing of a previous ($n-1^{st}$) layer package is started after the generation of a later ($n^{th}$) layer package.

6. A method for the production of a work piece comprising, in order, the steps of:
(a) providing at least one first horizontal layer of powdered starting material;
(b) compacting, by means of electromagnetic radiation or particle radiation, the at least one first horizontal layer of powdered starting material to form at least one first trace, each trace comprising two substantially vertical lateral faces surrounded by the powdered starting material;
(c) providing at least one subsequent horizontal layer of powdered starting material;
(d) compacting, by means of electromagnetic radiation or particle radiation, the at least one subsequent horizontal layer of powdered starting material to form at least one subsequent trace, each trace comprising two substantially vertical lateral faces surrounded by the powdered starting material;
(e) repeating steps (c) and (d) a sufficient enough number of times until a distance between the at least one first trace and a most recently formed one of the at least one subsequent trace is sufficiently great that there exists substantially no thermal impact having a distorting effect on the at least one first trace; and
(f) mechanically finishing at least one of the two vertical side walls of the at least one first trace, but no side walls of the at least one subsequent trace, while the at least one first trace is still surrounded by the powdered starting material.

* * * * *